United States Patent [19]
Schubert

[11] 3,923,173
[45] Dec. 2, 1975

[54] APPARATUS FOR TRANSPORTING RECEPTACLES

[75] Inventor: Bernard Schubert, Neu Bornsen, Germany

[73] Assignee: Hauni-Werke Körber & Co., KG, Hamburg, Germany

[22] Filed: Sept. 6, 1973

[21] Appl. No.: 394,724

Related U.S. Application Data

[60] Division of Ser. No. 292,630, Sept. 27, 1972, Pat. No. 3,820,671, said Ser. No. 292,630, is a continuation of Ser. No. 30,204, April 20, 1970, abandoned, which is a continuation of Ser. No. 631,504, April 17, 1967, abandoned, which is a continuation-in-part of Ser. No. 559,538, June 22, 1966, Pat. No. 3,444,981.

[30] Foreign Application Priority Data

June 23, 1965 Germany.............................. 56380

[52] U.S. Cl............................. 214/301; 214/16.4 C
[51] Int. Cl.²......................................... B65G 65/04
[58] Field of Search..... 214/16.4 A, 16.4 R, 16.4 C, 214/300, 301, 310, 6 H, 6 N; 53/149, 150, 236; 198/35; 131/25

[56] References Cited
UNITED STATES PATENTS

| | | | |
|---|---|---|---|
| 2,899,040 | 8/1959 | Smith et al...................... | 214/16.4 C |
| 3,190,459 | 6/1965 | Kochalski et al................... | 214/6 N |
| 3,341,036 | 9/1967 | Bardenhagen...................... | 53/148 |
| 3,349,928 | 10/1967 | Howard........................... | 214/16.4 C |
| 3,374,905 | 3/1968 | David et al........................ | 214/16 B |
| 3,444,981 | 5/1969 | Schubert........................... | 214/6 H |
| 3,448,846 | 6/1969 | Bardenhagen........................ | 53/150 |

Primary Examiner—Robert J. Spar
Assistant Examiner—Lawrence J. Oresky
Attorney, Agent, or Firm—Michael S. Striker

[57] ABSTRACT

An automatic transporting apparatus for cigarettes wherein receptacles in the form of chargers or trays circulate between two stations and move intermittently along an endless path having portions disposed in several vertical planes. One vertical portion of the path is adjacent to one or more filling devices which fill successive empty receptacles with blocks or groups of cigarettes at one of the stations, and another vertical portion of the path is adjacent to an evacuating device which removes cigarettes from filled receptacles at the other station and transfers the removed cigarettes onto a conveyor serving to transport a stream of cigarettes to a packaging machine. The cigarettes extend transversely of the bottom walls of the receptacles and the transporting system for receptacles includes two superimposed storing units in one of which filled receptacles can advance sideways toward the evacuating device in such a way that the cigarettes move axially. Empty receptacles can be moved sideways through the other storing unit toward the filling devices.

7 Claims, 7 Drawing Figures

APPARATUS FOR TRANSPORTING RECEPTACLES

CROSS-REFERENCE TO RELATED CASES

This is a division of my copending application Ser. No. 292,630 filed Sept. 27, 1972, now U.S. Pat. No. 3,820,671 granted June 28, 1974. The said application Ser. No. 292,630 is a continuation of Ser. No. 30,204 filed Apr. 20, 1970 now abandoned, which is a continuation of Ser. No. 631,504 filed Apr. 17, 1967, and now abandoned. The application Ser. No. 631,504 is a continuation-in-part of copending application Ser. No. 559,538 filed June 22, 1966, now U.S. Pat. No. 3,444,981 granted May 20, 1969.

BACKGROUND OF THE INVENTION

The present invention relates to automatic manufacturing and packaging plants for discrete commodities, particularly non-filter cigarettes, filter cigarettes, filter rods, non-filter cigars, filter cigars, non-filter cigarillos, filter cigarillos and analogous rod-shaped smokers' products. More particularly, the invention relates to improvements in apparatus which can be utilized to transport a supply of receptacles (also called trays or chargers) between a first station for one or more filling devices where the receptacles are filled with cigarettes or other rod-shaped smokers' products and a second station for an evacuating device which removes the products from filled receptacles and feeds them into one or more packaging or other processing machines. Still more particularly, the invention relates to improvements in transporting apparatus which may be utilized with into the formation and transportation of blocks or groups of accurately arrayed cigarettes or analogous rod-shaped commodities, for example, to transfer blocks of 20 cigarettes each from one or more makers to a packaging machine.

SUMMARY OF THE INVENTION

An object of the invention is to provide an automatic manufacturing and packaging plant for rod-shaped commodities, particularly for cigarettes or filter cigarettes, wherein te commodities can be assembled into blocks and fed to a packaging machine in a small area and in rapid sequence to meet the requirements of modern high-speed packaging or other processing machines.

Another object of the invention is to provide the manufacturing plant with a novel transporting apparatus which can transfer large numbers of blocks with requisite accuracy, without any damage to the commodities, and without changing the distribution of such commodities in the blocks.

A further object of out invention is to provide the transporting apparatus with a novel system of conveyors and to assemble the transporting apparatus in such a way that it can be readily combined with or incorporated in known tray-filling and tray-evacuating machines.

An additional object of the invention is to provide a transporting apparatus whose conveyors can support and store a large number of empty and filled receptacles in a small area and in such a way that empty receptacles can be automatically fed to one or more filling machines while the evacuating machine or machines always receive a succession of filled receptacles.

Still another object of the instant invention is to provide a manufacturing and packaging plant for cigarettes or like rod-shaped commodities which can store larger quantities of properly arrayed commodities while occupying the same or a smaller floor space than presently known plants of such character.

One feature of the invention resides in the provision of an apparatus for manipulating commodities, particularly rod-shaped smokers' products, which comprises first conveyor means arranged to supply a first stream of commodities to a first station (such conveyor means can include an endless belt which transports plain or filter cigarettes from a producing machine along a substantially horizontal path and in such a way that the cigaarettes travel sideways), collector means (e.g., a suitably configurated suction head) provided at the first station and operative to convert the leading end of the first stream of commodities into groups of commodities (each such group may include one or more layers of parallel commodities), transfer means for introducing several groups of commodities into each of a succession of empty receptacles to thereby convert empty receptacles into filled receptacles, evacuating means which serves to remove commodities from filled receptacles at a second station (the evacuating means may comprise transfer means which removes commodities in the form of groups), and second conveyor means for transporting the removed commodities from the second station in the form of a second stream (for example, the commodities of the second stream can fill the pockets of an endless flexible element which constitutes or forms part of the second conveyor means).

Another feature of the invention resides in the provision of an automatic manufacturing and packaging plant for discrete commodities in the form of rod-shaped smokers' products or the like. The plant comprises at least one producing machine whose output is variable (such producing machine may constitute or include a filter cigarette making machine, a machine for making of plain cigarettes or a combination of two or more such machines), at least one packaging machine whose requirements are variable, first conveyor means for transporting a first stream of commodities from the producing machine to a first station, second conveyor means for transporting a second stream of commodities from a second station to the packaging machine, a supply of receptacles which normally includes filled and empty receptacles, transporting means which is operative to convey receptacles between the two stations, means for transferring groups of commodities from the first stream into empty receptacles at the first station, means for transferring commodities from filled receptacles to the second conveyor means at the second station, and means (including electric switches, motors and the like) for regulating the operation of the transporting means so as to maintain a filled receptacle in a position of readiness at the second station and to maintain an empty receptacle in a position of readiness at the first station as long as the supply of receptacles respectively includes filled and empty receptacles so that the number of filled and empty receptacles on the transporting means varies in dependency on the varying output of the producing machine and on the varying requirements of the packaging machine.

The novel features which are considered as characteristic of the invention are set forth in particular in the appended claims. The improved transporting apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
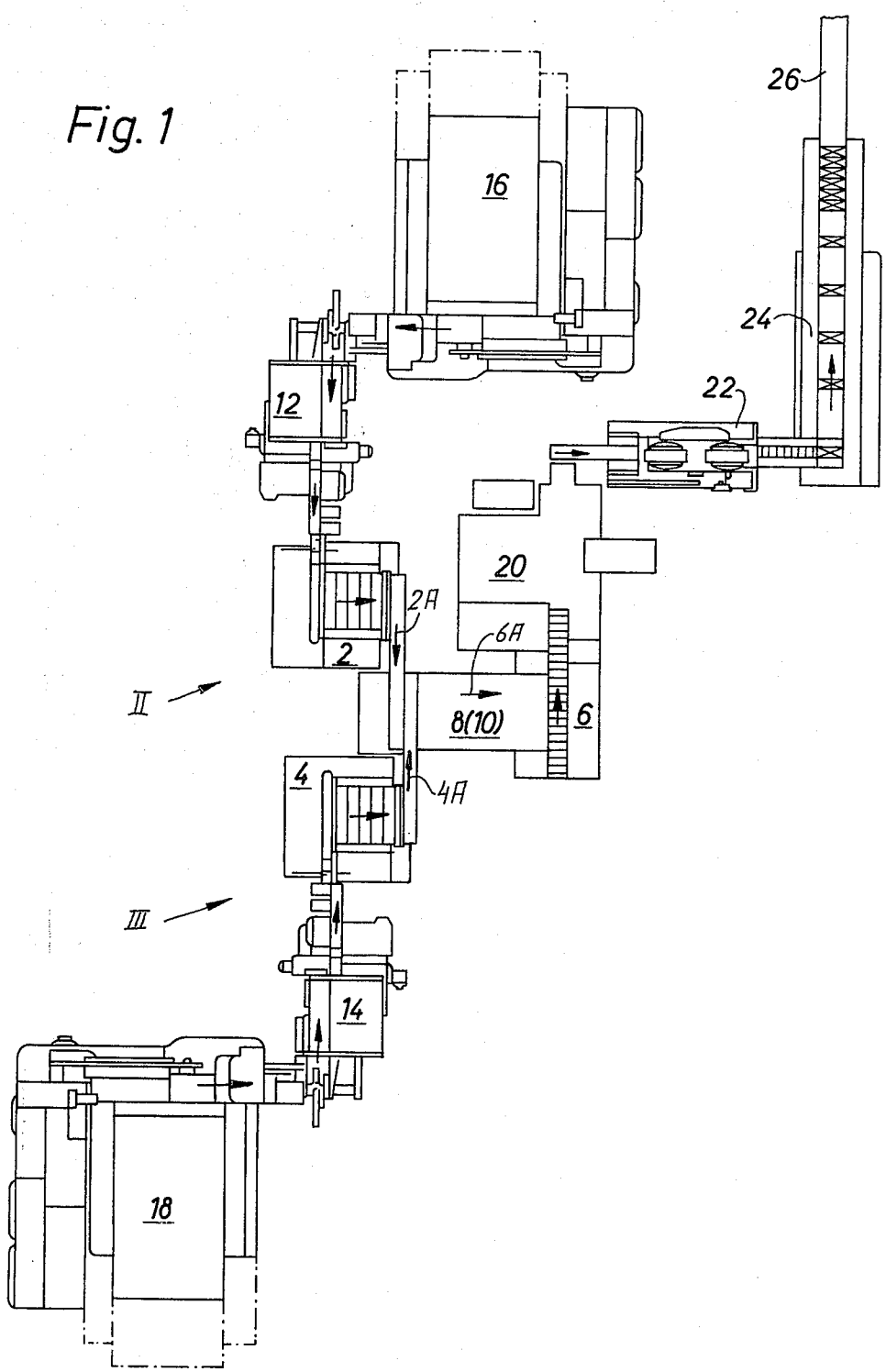
FIG. 1 is a schematic top plan view of an automatic manufacturing and processing plant for filter cigaretts including a transporting apparatus which embodies one form of the invention.
Figure 2:
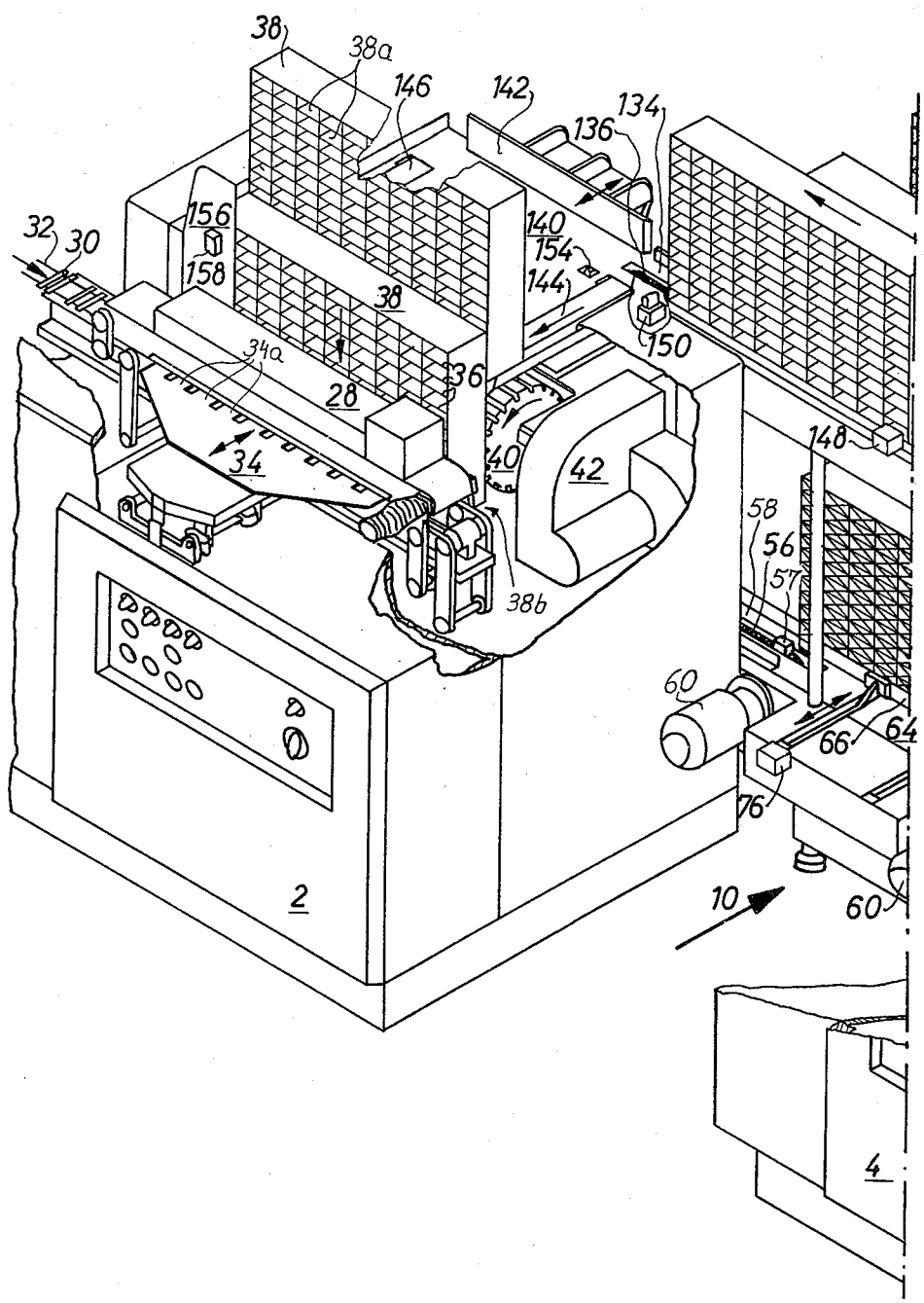
FIG. 2 is an enlarged fragmentary perspective view of a portion of the transporting apparatus, substantially as seen in the direction of arrow II in FIG. 1.
Figure 3:
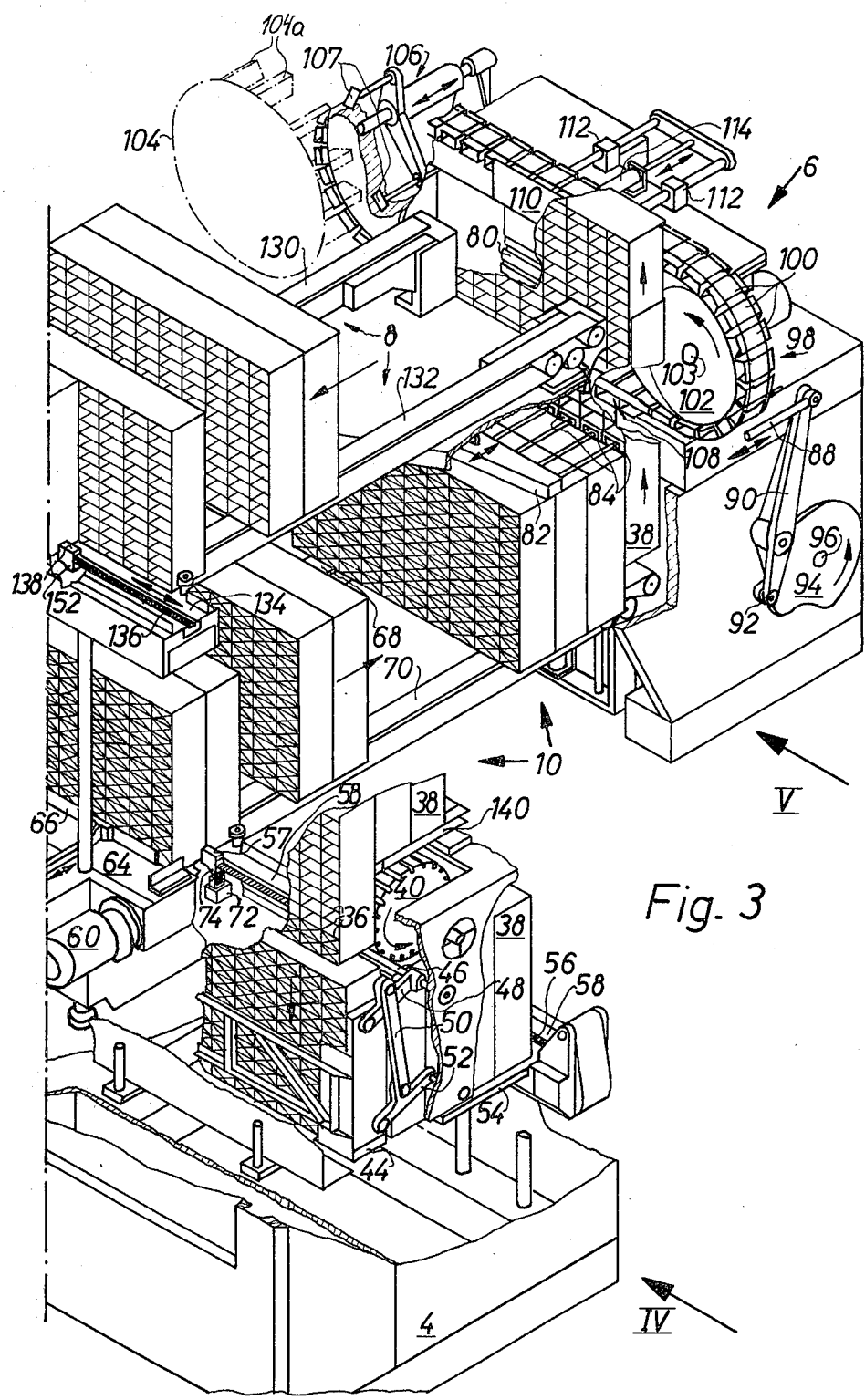
FIG. 3 is an enlarged fragmentary perspective view of a portion of the transporting apparatus substantially as seen in the direction of arrow III in FIG. 1.

Referring first to FIG. 1, the improved transporting apparatus couples two filling devices or machines 2, 4 with an evacuating device or machine 6 and is installed in a plant or production line for automatic manufacture, packaging and further processing of rod-shaped commodities in the form of filter cigarettes. The transporting apparatus comprises two superimposed parallel straight horizontal main conveyors 8 and 10 which respectively constitute storing units for empty and filled receptacles and form part of a conveyor system which transports the receptacles along an endless path. The filling machines 2 and 4 are installed at two spaced-apart filling stations and respectively receive filter cigarette from two filter cigarette producing machines or makers 12 and 14, and these makers respectively receive non-filter cigarettes from two cigarette making machines 16 and 18. The evacuating machine 6 occupies an evacuating station behind the main conveyors 8 and 10 and is combined with the transportinng apparatus and with a packaging machine 20 which provides blocks of accurately arrayed filter cigarettes with inner and outer wrappers. The packs issuing from the packaging machine 20 are fed into a wrapping machine 22 which provides each pack with a transparent plastic envelope, and the thus wrapped packs are thereupon fed into a bunching machine 24 which assembles predetermined number of packs into bunches, and such bunches are then received and transported by a takeoff conveyor 26. The transporting apparatus which includes the main conveyors 8 and 10 is capable of supplying to the evacuating machine 6 the combined output of both filling machines 2 and 4. Its details are shown in FIGS. 2 to 5.

The two filling machines 2, 4 are of identical construction and are mirror symmetrical with reference to each other. Each of these machines comprises a suction head or collector 28 which picks up filter cigarettes 30 from a supply conveyor 32 (also called catcher band) carrying the output of the respective maker 12 or 14 in the form of a stream wherein the cigarettes travel sideways. The collector 28 assembles successive layers or groups each of which contains a predetermined number of filter cigarettes 30 removed from the leading end of the stream on the supply conveyor 32. Each such layer is then transformed into ten coplanar rows containing six or seven cigarettes each, it being assumed that the packaging machine 20 is arranged to receive blocks 160 (see FIG. 5) of twenty cigarettes each in the usual array, namely, two outer rows of seven cigarettes each and a median row of six cigarettes whose cigarettes are staggered transversely with reference to the cigarettes of the two outer rows. The manner in which the collector 28 can pick up a single layer and converts it into a predetermined number of coplanar rows is disclosed, for example, in the aforementioned U.S. Pat. No. 3,444,981 which is incorporated herein by reference. The collector 28 cooperates with a first transfer member 34 which resembles a flat plate-like body and is provided with a row of ten coplanar pushers 34a each of which can shift a row of filter cigarettes 30 from the flutes at the underside of the collector 28 into an empty or partially filled multicell receptacle or charger 38 which is located directly behind the collector. The charger 38 has several superimposed parallel rows of ten cells 36 each, and one such row registers with the pushers 34a when the transfer member 34 performs a working stroke and moves ten rows fo six or seven cigarettes each axially toward the charger 38. The transporting apparatus comprises two rotary drum-shaped conveyors 40 each of which is located behind one of the collectors 28 and serves to move the respective charger 38 downwardly in stepwise fashion so that a row of cells 36 is always ready to receive a row of filter cigarettes 30 when the respective transfer member 34 performs a working stroke.

Figure 4:
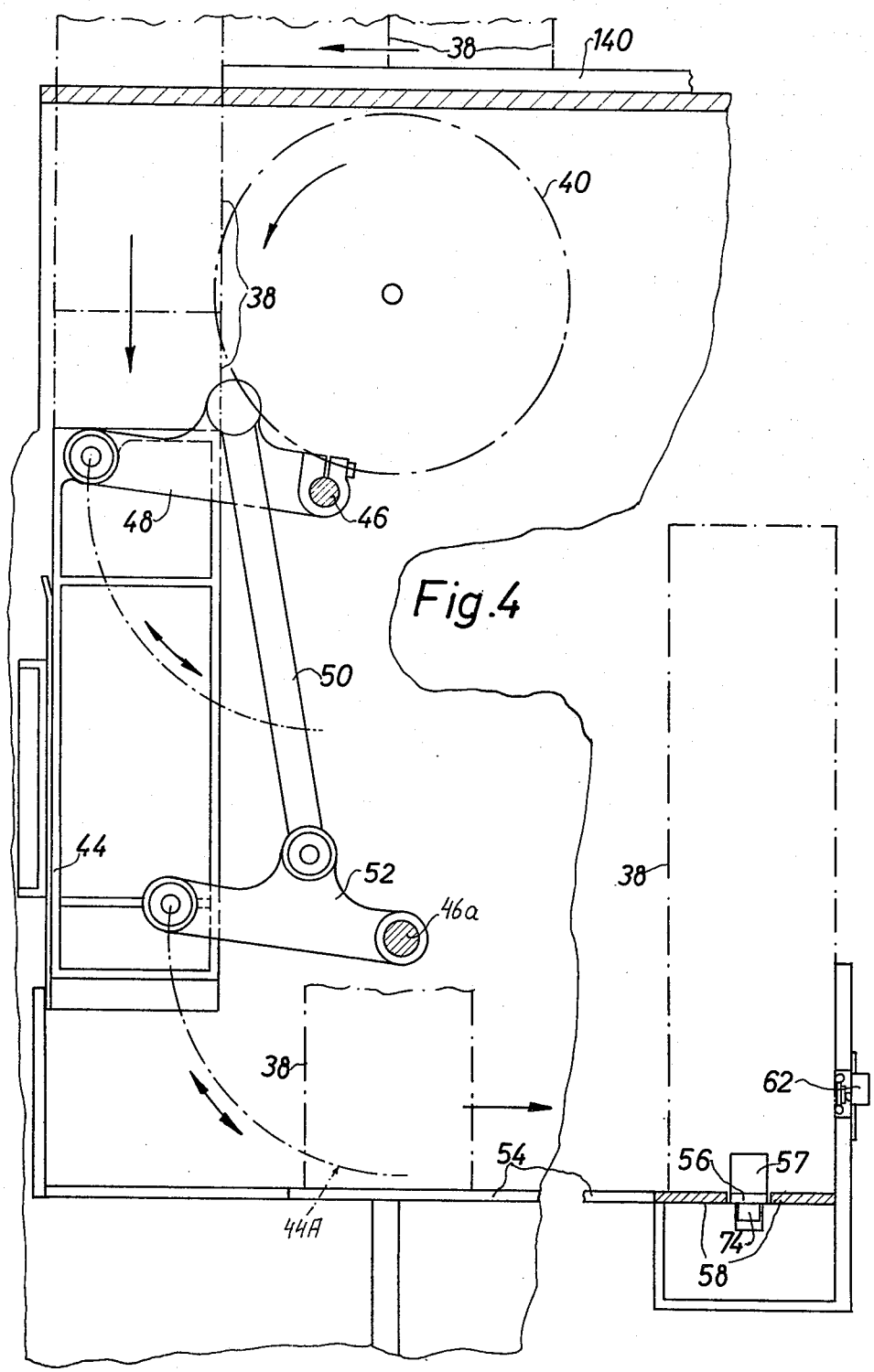
FIG. 4 is an enlarged side elevational view of a portion of the transporting apparatus as seen in the direction of arrow IV in FIG. 3.

Each drum 40 is indexed in synchronism with the operation of the respective transfer member 34 and cooperates with the horizontal partitions 38a of the adjoining charger 38. The chargers have bottom walls 38b whose length exceeds their width and the cigarettes 30 which enter the cells 36 extend transversely of such bottom walls. The chargers 38 can be said to constitute racks and the drums 40 constitute pinions which mesh with the respective chargers to lower them stepwise behind the associated collectors 28. Each drum 40 is rotated intermittently by an indexing mechanism 42. A vertically movable conveyor or platform 44 (FIGS. 3 and 4) is provided below and forwardly of each drum 40, and each of these platforms 44 is raised and lowered by a drive mechanism including a pneumatic cylinder and piston unit (not shown) which rocks a lever connected to a shaft 46, the latter carrying two linds 48 coupled to the respective side walls of the platform 44. Two additional links 52 are connected to the lower portions of such side walls and are articulately connected to the upper links 48 by elongated connecting rods 50. The links 52 can rock about a fixed horizontal shaft 46a located at a level below the shaft 46. As shown in FIG. 4, the drive mechanism 46–52 can raise or lower the chargers 38 and can also move the chargers rearwardly (see the phantom line 44A) without changing the inclination of the chargers. The just described drive mechanism can transfer filled chargers onto a horizontal conveyor table 54 which is located at a level below the respective drum 40. The table 54 serves as a means for guiding and supporting filled chargers when such chargers travel in the lowermost portions of their paths toward the evacuating machine 6. The transporting apparatus comprises two lower auxiliary conveyors 56 which serve to move filled chargers 38 sideways as indicated in FIG. 1 by arrows 2A and 4A. Each conveyor 56 comprises ways 58 and an endless chain provided with motion transmitting lugs 57. Each chain is driven by a motor 60 which is started by an electric switch 62 located at a level above the respective table 54 and actuable by successive filled chargers 38. The upper stretches of the endless chains of the auxiliary conveyors 56 advance filled chargers 38 toward a junction in the transporting apparatus at which the filled chargers begin to advance rearwardly and away from the filling machines 2, 4 in a direction toward the evacuating machine 6. The just mentioned junction accommodates a shuffling platform 64 and a shifting member 66 which is operated by a crank drive (not shown). The lower main convey, 10 of the transporting apparatus comprises two flexible elements here shown as bands 68, 70 which serve to advance filled chargers 38 sideways in the direction indicated in FIG. 1 by arrow 6A. During such advance of chargers 38, the cigarettes 30 move lengthwise. Electric switches 72 are installed below the discharge ends of auxiliary conveyors 56 close to the shuffling platform 64. These switches can be operated by actuating members or trips 74 on the lugs 57 of the respective auxiliary conveyors 56. The trips 74 and switches 72 perform the dual function of arresting the motors 60 of the respective auxiliary conveyors 56 and of simultaneously starting the drive for the shifting member 66. The shuffling platform 64 supports an electric switch 76 which is actuated by the shifting member 66 and is connected in series with the electric switches 62. The position of one of the switches 62 is best shwon in FIG. 4 and it will be noted that this switch is actuated by a filled charger 38 when the latter is pushed onto the respective ways 58 so that it is ready to be transported by the respective auxiliary conveyor 56.

Figure 5:
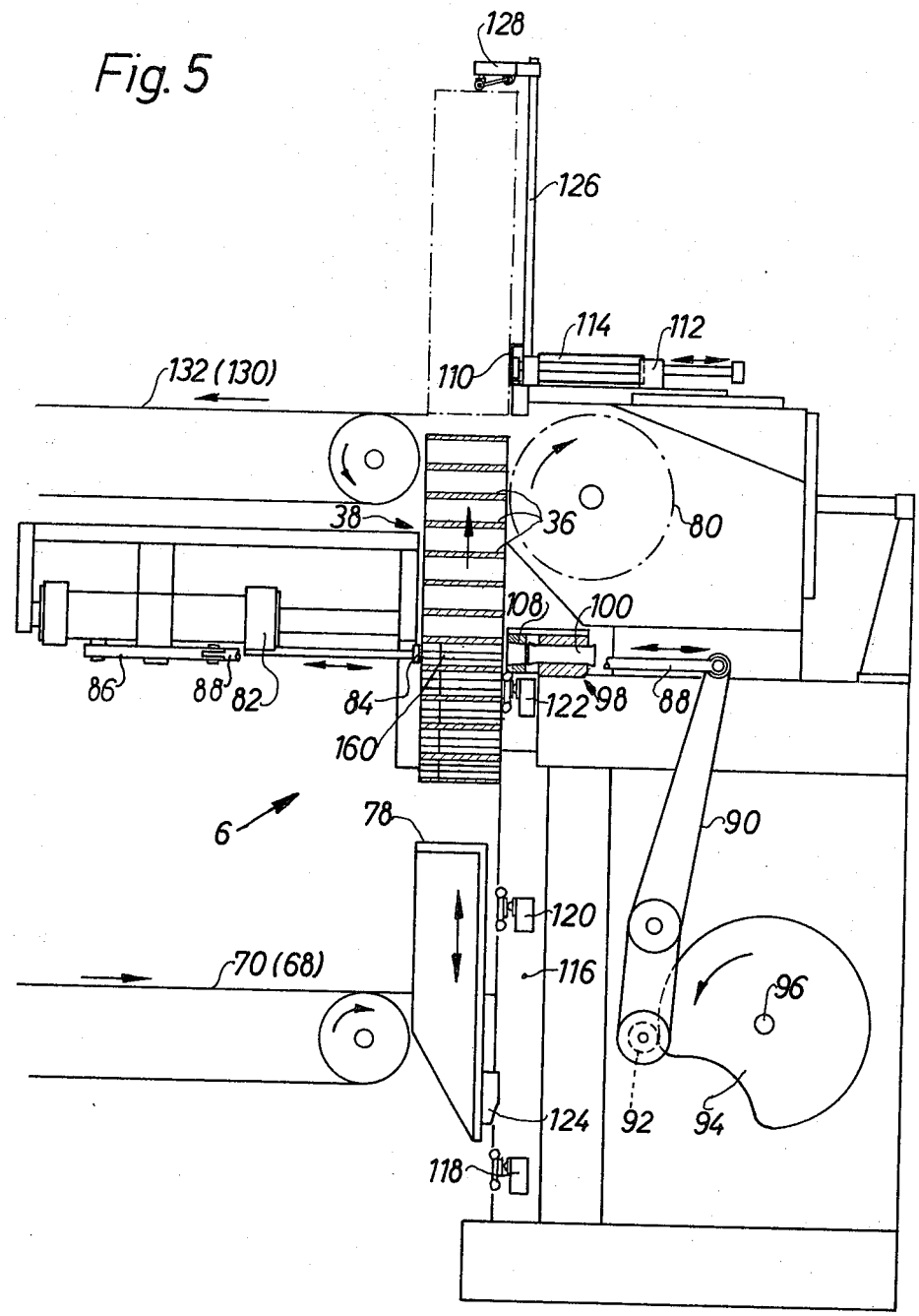
FIG. 5 is an enlarged side elevational view as seen in the direction of arrow V in FIG. 3.

The discharge ends of the bands 68, 70 are located in front of the evacuating machine 6 and deliver successive filled chargers 38 into the range of an elevating device including a vertically reciprocable conveyor or platform 78 best shown in FIG. 5. This platform 78 serves to lift filled chargers 38 into the range of a further drum-shaped conveyor or pinion 80 whose operation is analogous to that of the drums 40 and which is indexible to lift the chargers 38 stepwise during evacuation of cigarette blocks 160 from the rows of cells 36. The drum 80 is indexed in synchronism with the operation of a second reciprocable transfer member 82 which comprises ten coplanar plungers 84 each of which can evacuate the contents of an entire cell 36, i.e. each plunger 84 can expel from a charger 38 a complete block 160 of 20 filter cigarettes 30 at a time. The drive which reciprocates the transfer member 82 includes a cam shaft 96 which rotates a disk-shaped cam 94 cooperating with a roller follower 92 provided on the lower arm of a two-armed lever 90. The upper arm of the lever 90 is connnected to a rod 88 which rocks a lever 86, the latter being connected with the transfer member 82. The just described parts 86–96 cause the transfer member 82 to perform working strokes and the drive further includes a suitable spring which is attached to the lever 90 to bias the follower 92 against the face of the cam 94 so that the transfer member 82 performs a return stroke whenever the follower 92 moves nearer to the axis of the cam shaft 96. The transfer member 82 forms part of the evacuating machine 6 which delivers groups of cigarettes 30 to an endless flexible conveyor 98 comprising two endless link chains and a series of transversely extending open-ended pockets 100 connected to the endless chains and serving to transport a stream of cigarettes 30 which move sideways. The conveyor 98 is driven intermittently by a sprocket 102 in such a way that ten empty pockets 100 register with ten filled cells 36 of a charger 38 which is engaged by the drum 80 when the transfer member 82 performs a working stroke whereby the plungers 84 transfer a group of ten blocks 160 of filter cigarettes 30 into such empty pockets.

A further transfer member 106 having two plungers 107 (see the upper left-hand portion of FIG. 3) forms part of the packaging machine 20 and serves to expel blocks 160 from filled pockets 100. Such blocks are introduced into hollow mandrels 104a of a conventional turret 104 which accommodate blocks 160 of 20 cigarettes each while the machine 20 wraps the blocks into inner and outer wrappers in a manner not forming part of the present invention. The evacuating machinw 6 further comprises a stationary mouthpiece 108 with ten coplanar channels which guide the blocks 160 during transfer from cells 36 into the registering pockets 100.

The transporting apparatus further comprises a displacing conveyor or device 110 which transfers empty chargers 38 onto the endless flexible elements or bands 130, 132 of the upper main conveyor 8, the latter serving to move such empty chargers sidewayss toward but at a level above the shuffling platform 64. The displacing device 110 is guided in bearings 112 shown in the upper part of FIG. 3 and in FIG. 5, and the drive for reciprocating the device 110 comprises a pneumatic cylinder and piston unit 114.

The sprocket 102 for the chains of the flexible conveyor 98 is driven by a shaft 103 which is operatively connected with the indexing mechanism for the drum 80 and with the cam shaft 96 and operates in synchronism with the drive for the packaging machine 20, i.e. with the drive for the third transfer member 106. The arrangement is such that the conveyor 98 is advanced by five steps each of which corresponds to twice the distance between the centers of two adjoining pockets 100 during each interval when the transfer member 106 performs a working stroke during each interval between two successive steps of the conveyor 98 whereby the plungers 107 transfer two blocks 160 of 20 cigarettes 30 each into the registering empty mandrels 104a of the turret 104. Upon completion of each fifth step, ten empty pockets 100 register with a row of ten filled cells 36 in that charger 38 which is engaged by the drum 80, and the transfer member 82 then performs a rapidly executed wording stroke so that its plungers 84 transfer a group of ten blocks 160 into the registering pockets 100. The blocks 160 are caused to pass through the corresponding channels of the mouthpiece 108.

The housing or frame 116 of the evacuating machine 6 carries three electric switches 118, 120, 122 which are adjacent to the path of movement of the platform 78 (see FIG. 5). The platform 78 carries an actuating member or trip 124 which can operate the switch 118, the latter serving to start the drive for the endless bands 68, 70 of the lower main conveyor 10. The switch 120 is operated by the foremost filled charger 38 on the bands 68, 70 and serves to arrest the just mentioned drive for the bands 68, 70. At the same time, the switch 120 starts the drive for the platform 78 so the platform moves upwardly and advances the filled charger 38 into the range of the drum 80. The drive for the platform 78 comprises a pneumatic cylinder and piston unit which is not shown in the drawings. The switch 122 is operated by a filled charger 38 on the platform 78 or by the platform itself and serves to reverse the drive for this platform when the respective filled charger reaches the drum 80 whereby the platform 78 descends to its lower end position and is ready to receive a fresh filled charger 38 from the bands 68, 70.

The aforementionned housing or frame 116 of the evacuating machine 6 further carries an electric switch 128 which is mounted on a supporting bracket 126 and is operated by an empty charger 38 when such charger reaches its upper end position. The empty charger is moved to such upper end position by the drum 80. The switch 128 causes the cylinder and piston unit 114 to perform a working stroke (in a direction to the left, as viewed in FIG. 5) whereby the displacing device 110 transfers the respective empty charger onto upper runs of endless bands 130, 132 which form part of the aforementioned upper main conveyor 8.

As stated before, the bands 130, 132 will transport empty chargers 38 back in a direction toward the shuffling platform 64. The bands 130, 132 deliver empty chargers onto a distributor platform 134 which distributes empty chargers to two upper axuiliary conveyors 136 each having an endless chain provided with motion transmitting lugs 138. The function of the auxiliary conveyors 136 is just the opposite of that of the lower auxiliary conveyors 56, i.e., they advance empty chargers back toward the corresponding filling machines 2, 4. The auxiliary conveyors 136 deliver empty chargers onto tables 140 each cooperating with an advancing member 142 and carrying a pair of endless conveyor bands 144, 146. The distributor platform 134 carries an electric switch 148 which is actuated by empty chargers 38 to start and arrest the drive for the bands 130, 132 of the upper main conveyor 8 as well as to start the drive for one of the auxiliary conveyors 136 in the one or the other direction. Two additional electric switches 150 are provided on the distributor platform 134 adjacent to the ends of the auxiliary conveyors 136 and each of these switches is actuatable by trips 152 provided on the lugs 138 of the respective conveyor 136. The switches 150 arrest the respective conveyors 136 and start the drives for the associated advancing members 142. Each table 140 carries an electirc selector switch 154 having a movable contact provided with a roller which extends above the surface of the table 140. When an empty charger 38 rests on the roller of the adjacent switch 154, the latter arrests the drive for the corresponding auxiliary conveyor 136. When the empty charger is moved off the respective switch 154, the latter starts the drive for the corresponding auxiliary conveyor 136 so that such conveyor advances empty chargers toward the respective drum 40. At a level above the tables 140, there are provided electric switches 158 which are mounted on supporting brackets 156. The switches 158 are actuated by empty chargers 38 to start and arrest the drives for the bands 144, 146.

The operation is as follow:

The machines 2 and 4 fill successive chargers 38 in a manner as disclosed in the aforementioned U.S. Pat. No. 3,444,981 of Schubert. Thus, the pushers 34a of the transfer member 34 shift successively assembled rows of filter cigarettes 30 in the axial direction of such cigarettes whereby the cigarettes leave the flutes of the corresponding collectors 28 and enter the registering cells 36. The operation of each transfer member 34 is synchronized with operation of the respective collector 28 and the latter assembles, successively, a group of 10 rows of seven cigarettes each, a group of 10 rows of six cigarettes each, and a group of 10 rows of seven cigarettes each so that the cells 36 receive blocks 160 each of which contains two outer rows of weven cigarettes each and a median row of six cigarettes in an array which is customary in cigarette packs. The drive for the transfer member 34 controls the operation of the indexing mechanism 42 for the corresponding drum 40 so that the latter lowers the charger 38 in stepwise fashion. The axially parallel ribs of the drum 40 act not unlike the teeth of a pinion and cooperate with the horizontal partitions 38a of the adjoining empty or partially filled charger 38 to lower the latter at intervals determined by the associated transfer member 34. Each third angular displacement of the drum 40 is greater than the preceding two to account for the thickness of partitions 38a.

When a charger 38 is filled, i.e., when each of the uppermost row of its cells 36 has received a third or uppermost row of filter cigarettes 30, the bottom wall 38b of such filled charger comes to rest on the corresponding platform 44 which latter is then held in its uppermost position. A suitable pressure-responsive valve (not shown) is actuated by the filled charger 38 and operates the pneumatic cylinder and piston unit which rotates or permits rotation of the shaft 46 in a counterclockwise direction, as viewed in FIG. 3, so that the platform 44 travels along the arcuate path 44A in FIG. 4 and transfers the filled charger 38 onto the corresponding table 54. The cylinder and piston unit of the drive for the platform 44 is preferably of the double-acting type so that it can rotate the shaft 46 in two directions. As shown in FIG. 4, the parts 48–52 can move a filled charger 38 downwardly and rearwardly so that a charger which comes to rest on the table 54 does not interfere with stepwise descent of a partially filled charger which is engaged by the drum 40. As the platform 44 deposits a filled charger 38 onto the table 54, it simultaneously pushes a column of filled chargers 38 along the table 54 so that the rearmost filled charger advances onto the associated ways 58 and is located in the path of movement of lugs 57 on the corresponding auxiliary conveyor 56. Such rearmost charger 38 also actuates the switch 62 which starts the motor 60 that the auxiliary conveyor 56 advances the filled charger along the ways 58 and toward the shuffling platform 64. When the platform 44 reaches its lower end position, it resets the aforementioned valve so that the pneumatic cylinder and piston unit operates in reverse and returns the platform 44 to the upper end position shown in FIG. 4. This platform is then ready to receive the next-following filled charger 38.

When a filled charger 38 reaches the shuffling platform 64, the trip 74 of the lug 57 which has pushed such filled charger along the ways 58 actuates the corresponding switch 72 which arrests the motor 60 for the auxiliary conveyor 56 and starts the drive for the shifting member 66 so that the latter performs a working stroke and pushes the rearmost filled charger of the column on the platform 64 onto the receiving ends of the endless bands 68, 70. The drive for the shifting member 66 is operatively connected with both motors 60 in such a way that the shifting member 66 is free to perform a working stroke only when the motors 60 are idle. This prevents collision of filled chargers 38 on the shuffling platform 64.

Upon completion of a working stroke, the shifting member 66 immediately returns to retracted position and actuates the switch 76 whose contacts are connected in series with the two switches 62 and which selects the circuits of the motors 60.

The two auxiliary conveyors 56 operate in two parallel planes so that chargers which were filled by the machine 2 are transferred onto the shuffling platform 64 behind chargers which were filled by the machine 4. In other words, a filled charger 38 coming in a direction from the machine 2 is more distant from the shifting member 66 (when the latter is moved to retracted position) than a charger 38 which has been filled by the machine 4.

The bands 68, 70 advance filled chargers 38 toward the evacuating machine 6 and the blocks 160 are evacuated by the transfer member 82. The discharge ends of the bands 68, 70 deliver successive filled chargers 38 onto the platform 78 (FIG. 5). Actually, the rearmost filled charger 38 is trnasferred onto the platform 78 by the next-following filled charger whenever the bands 68, 70 advance by a step in the direction indicated in FIG. 1 by the arrow 6A. A filled charger 38 which has been transferred onto the platform 78 actuates the switch 120 which arrests the drive for the bands 68, 70 and energizes the solenoid of an electromagnetic valve (not shown) for the pneumatic cylinder and piston unit which lifts the platform 78. The upwardly moving platform 78 advances the filled charger 38 into abutment with the partially evacuated charger thereabove and continues to move the filled charger upwardly until the latter enters the range of and is engaged by the drum 80. The platform 78 is moved downwardly when the charger 38 on the platform 78 releases the switch 122. The indexing movements of the drum 80 are greater than those of the drum 40 because the drum 80 must lift a charger 38 by steps corresponding to the distance between the centers of two superimposed cells 36. As explained above, the plungers 84 of the second transfer member 82 transfer a group consisting of a full row of blocks 160 at a time, i.e., the transfer member 82 will perform a single working stroke while the transfer member 34 completes three working strokes. The operation of the transfer member 82 is synchronized with the operation of drum 80 in such a way that the plungers 84 transfer a row of blocks 160 into the registering pockets 100 of the flexible conveyor 98 while the charger 38 dwells between two successive stepwise advances in response to indexing of the drum 80. Blocks 160 which are transferred by the plungers 84 travel through the channels of the mouthpiece 108 and come to rest in the registering pockets 100. As stated before, the sprocket 102 advances the conveyor 98 by five steps in response to a single indexing movement of the drum 80, and each such step corresponds to twice the distance between the centers of two adjoining pockets 100 so that the conveyor 98 maintains 10 empty pockets 100 in registry with the mouthpiece 108 whenever the transfer member 82 begins a working stroke to expel a group of 10 blocks 160 from a row of cells 36 in that charger 38 which is engaged by the drum 80. The transfer member 106 of the packaging machine 20 causes its plungers 107 to transfer two blocks 160 from the registering pockets 100 into the corresponding mandrels 104a of the turret 104 during each interval between successive stepwise advances of the flexible conveyor 98.

When the drum 80 takes over a filled charger 38 from the platform 78, such filled charger 38 begins to move upwardly in response to indexing of the drum 80 and the switch 122 then reverses the drive for the platform 78 and causes the latter to return to the lower end position. When the platform 78 reaches such lower end position, its trip 124 actuates the switch 118 which arrests the drive for the platform 78 and simultaneously starts the drive for the bands 68, 70 of the lower main conveyor 10 so that the bands advance a filled charger 38 onto the platform 78. Such filled charger actuates the switch 120 and the procedure is repeated in the aforedescribed sequence.

When the plungers 84 of the transfer member 82 have completed the transfer of blocks 160 from the lowermost row of cells 36 in a charger 38 which is engaged by the drum 80, the thus emptied charger assumes the phantom-line position shown in FIG. 5 and actuates the switch 128 which energizes the solenoid of a valve in the circuit of the drive 114 for displacing device 110. This device 110 performs a single working stroke and transfers the empty charger onto the bands 130, 132 of the upper main conveyor 8. Such transfer of an empty charger 38 onto the bands 130, 132 need not necessarily start the drive for these bands.

When one of the upper auxiliary conveyors 136 advances an empty charger from the distributor platform 134 toward the corresponding table 140 to such an extent that the thus advanced charger moves off the roller of the switch 148 on the platform 134, the latter starts the drive for the bands 130, 132 of the main conveyor 8 and the bands continue to advance the empty charger which has been transferred by the displacing device 110 until such empty charger comes to rest on the switch 148 and thereby arrests the drive for the bands 130, 132. Of course, the bands 130, 132 may support an entire row or column of empty chargers so that they will advance only by a step in order to transfer an empty charger onto the platform 134 and to actuate the switch 148.

An empty charger 38 which rests on the switch 148 remains in such position until one of the filling machines 2, 4 sends a signal that it requires an empty charger. Such signal is transmitted by the corresponding selector switch 154 which causes the bands 144, 146 to advance the column of empty chargers on the corresponding table 140 by a step so that the corresponding auxiliary conveyor 136 can deliver an empty charger from the distribution platform 134. For example, if the switch 154 on the table 140 which is adjacent to the filling machine 2 sends a signal that the auxiliary conveyor 136 can advance an empty charger from the distributor platform 134 toward the table 140, one lug 138 of such auxiliary conveyor 136 advances the registering empty charger along the upper stretch of the auxiliary conveyor 136 and toward the table 140 behind the machine 2. The trip 152 of the lug 138 then actuates the switch 150 which arrests the drive for the auxiliary conveyor 138 and starts the drive for the adjoining advancing member 142. The member 142 performs a single working stroke toward the machine 2 and transfers the freshly delivered empty charger 38 onto the switch 154 whereby the switch 154 blocks the drive for the auxiliary conveyor 136 so that the latter cannot transfer another empty charger until after the preceding empty charger moves off the switch 154. However, the auxiliary conveyor 136 can be driven in the opposite direction to return its lug 138 into a receiving position with reference to an empty charger on the distributor platform 134.

When the drum 40 behind the machine 2 has lowered a charger 38 to such an extent that this charger descends to a level below the corresponding switch 156, the latter starts the drive for the bands 144, 146 so that these bands advance an empty charger into registry with the descending charger. The thus advanced empty charger releases the switch 154 which releases or unblocks the drive of the associated auxiliary conveyor 136 so that the latter can remove an empty charger form the distributor platform 134 unless the other auxiliary conveyor has received a signal to deliver an empty charger to the machine 4.

As the bands 144, 146 advance an empty charger 38 toward the rear side of the machine 2, such empty charger actuates the switch 158 which then arrests the drive for the bands 144, 146. This empty charger then shares stepwise movements of the preceding charger which is still engaged by the adjoining drum 40. When the preceding charger is filled, the empty charger is positively engaged by the drum 40 and is thereupon lowered stepwise in a manner as described above. The empty charger exerts pressure on the filled charger below it so that such filled charger bears against the platform 44 (FIG. 4) and the platform actuates the aforementioned pressure-responsive switch which causes the drive for the platform 44 to transfer the filled charger onto the corresponding table 54.

Figure 6:
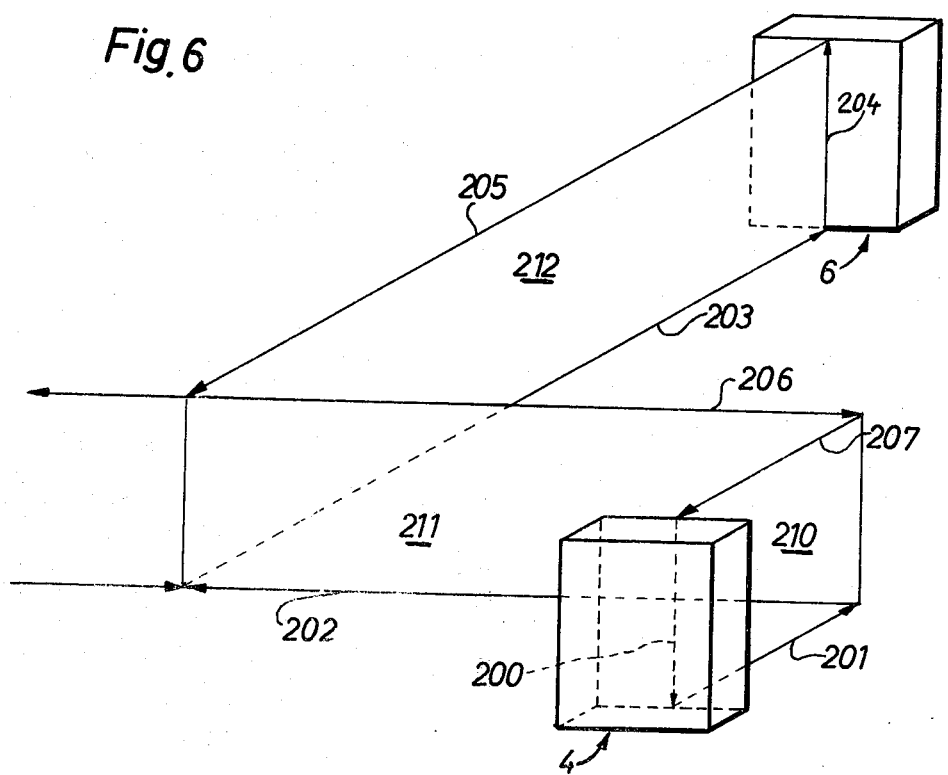
FIG. 6 is a simplified perspective view of the structure shown in FIG. 3 and illustrates the path of movement of filled and empty receptacles between a filling station and a evacuating station.

Of course, the construction of the improved transporting apparatus can be simplified considerably if the evacuating machine 6 receives the output of a single filling machine 2 or 4. The chargers 38 then circulate along an endless path which is located in a single vertical plane in contrast to the apparatus of FIGS. 1 to 5 wherein chargers travelling between the machine 6 and the machine 2 or 4 travel in three mutually inclined vertical planes, namely, in a first plane which is defined by the main conveyors 8, 10 the platform 78, drum 80 and the displacing device 110, in a second plane which is defined by auxiliary conveyors 56, 136, and in a third plane defined by the bands 144, 146, drum 40, platform 44 and table 54. During travel in the first and third planes, the cigarettes 30 move axially. When travelling in the second plane, the cigarettes 30 move sideways. The manner in which the chargers 38 travel between the filling machine 4 and the evacuating machine 6 is illustrated schematically in FIG. 6. The arrow 200 indicates the direction of travel of empty, partially filled and filled chargers 38 with the drum 40 and platform 44. The arrow 201 indicates the direction of travel of filled chargers 38 along the table 54, and the arrow 202 indicates the direction of travel of filled chargers with the lower auxiliary conveyor 56. During travel with the bands 68, 70 of the lower main conveyor 10, filled chargers 38 advance in the direction of arrow 203, and the arrow 204 indicates the direction of travel of filled, partially filled and empty trays with the platform 78 and drum 80. The arrow 205 shows the direction of travel of empty chargers with the displacing member 110, bands 130, 132 of the upper main conveyor 8 and on the distributor platform 134. The arrow 206 indicates the direction of travel of empty chargers with the upper auxiliary conveyor 136, and the arrow 207 shows the direction of travel of an empty charger with the bands 144, 146 on the table 140. The arrows 200, 201 and 207 are located in a first vertical plane 210; the arrows 202, 206 are located in a second vertical plane 211; and the arrows 203, 204, 205 are located in a third vertical plane 212. In the illustrated embodiment, the planes 210, 212 make right angles with the plane 211.

Figure 7:
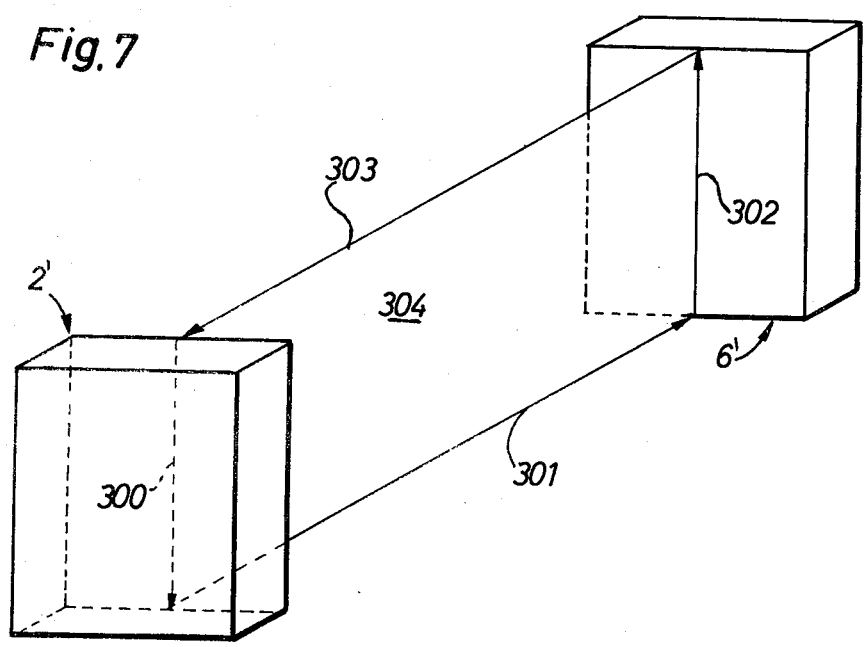
FIG. 7 is a similar perspective view illustrating the path of movement of receptacles in an automatic manufacturing and processing plant which comprises a single filling device.

FIG. 7 illustrates schematically a transporting apparatus which can transfer empty and filled receptacles or chargers between a single filling machine 2' and a single evacuating machine 6'. The arrow 300 indicates the direction of travel of empty chargers with the drum 40 and platform 44 which latter then transfers filled chargers directly onto the bands 68, 70 of the lower main conveyor 10 whereon filled chargers advance in the direction indicated by arrow 301. The arrow 302 indicates the direction of travel of filled, partially filled and empty chargers with the platform 78 and drum 80. The arrow 303 indicates the direction of travel of empty chargers with the bands 130, 132 of the upper main conveyor 8 which latter delivers empty chargers directly into the range of the drum 40. It will be seen that the arrows 300–303 are located in a single vertical plane 304. During travel in the plane 304, the cigarettes move axially or lengthwise.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefor, such adaptations should and are intended to be comprehended within the meaning and range of equivalence of the claims.

What is claimed as new and desired to be protected by Letters Patent is set forth in the appended claims:

1. Apparatus for transporting rod-shaped smokers' products in receptacles having superimposed compartments for groups of products, comprising means for supplying a stream of individual rod-shaped products which form a row to a first station along a predetermined path wherein the products move sideways tranversely to the longitudinal axis of said products; collector means operative to convert the leading end of said stream at said first station into groups of parallel products; means for transferring said groups into successive compartments of a series of receptacles to thus convert such receptacles into filled receptacles; means for conveying receptacles substantially vertically at and away from said station, thereupon substantially horizontally in the longitudingal direction of products in the filled receptacles, and thereupon substantially vertically to a second station; means for removing said groups from filled receptacles at said second station, including means for moving the products of said groups lengthwise; and means for advancing the thus removed groups from said second station in the form of a stream of articles or groups of articles along a predetermined path wherein the products move sideways transversely to the parallel longitudinal axes of the products which make up said groups.

2. Apparatus as defined in claim 1, for transporting rod-shaped products of predetermined length, wherein said compartments of said receptacles have a depth substantially equal to said predetermined length.

3. Apparatus as defined in claim 1, wherein said conveying means comprises a conveyor arranged to move the receptacles stepwise at said first station so as to place successive compartments of a receptacle on said conveyor into the range of said first mentioned transferring means, said first mentioned tranferring means being operative to transfer groups of products into empty compartments during intervals between stepwise movements of a receptacle at said first station.

4. Apparatus as defined in claim 1, wherein said supplying means comprises an endless conveyor.

5. Apparatus as defined in claim 1, wherein said first mentioned transferring means comprises a member which is reciprocable transversely of said first mentioned path.

6. Apparatus as defined in claim 1, wherein said compartments of said receptacles have open first ends through which the groups of products enter the compartments at said first station and open second ends opposite said first ends, said last mentioned transferring means comprising plunger means reciprocable transversely of said last mentioned path to enter a compartment of a receptacle at said second station by way of said first open end and to thereby expel at least one group from such compartment by way of said second open end.

7. Apparatus as defined in claim 1, wherein said last mentioned transferring means comprises plunger means operative to simultaneously expel a plurality of groups from a receptacle at said second station.

* * * * *